United States Patent [19]

Icking

[11] 4,432,700
[45] Feb. 21, 1984

[54] MILK PUMPING SYSTEM FOR VACUUM MILKING INSTALLATIONS

[75] Inventor: Friedrich Icking, Oelde, Fed. Rep. of Germany

[73] Assignee: Westfalia Separator AG, Oelde, Fed. Rep. of Germany

[21] Appl. No.: 346,478

[22] Filed: Feb. 5, 1982

[30] Foreign Application Priority Data

Mar. 21, 1981 [DE] Fed. Rep. of Germany ....... 3111233

[51] Int. Cl.$^3$ .............................................. F04F 1/12
[52] U.S. Cl. .................................. 417/121; 119/14.07; 137/205; 141/311 R; 222/205
[58] Field of Search ............... 119/14.05, 14.06, 14.07, 119/14.46; 137/205; 141/35, 40, 41, 42, 43, 50, 59, 60, 311 R; 417/121, 126, 138, 148; 222/56, 205, 457

[56] References Cited

U.S. PATENT DOCUMENTS 1,281,146 10/1918 Davies .............................. 119/14.05
3,008,450 11/1961 Brunson ............................ 119/14.05
3,658,441 4/1972 Bender .......................... 119/14.06 X Primary Examiner—John W. Shepperd
Assistant Examiner—Mark Thronson
Attorney, Agent, or Firm—Sprung Horn Kramer & Woods

[57] ABSTRACT

A milk pumping system used in vacuum milking installations for the purpose of withdrawing the milk that is in a vacuum milk receiver that is under constant vacuum, in cases wherein the milk must be pumped to a higher and more remote bulk tank that is under atmospheric pressure. For this purpose a milk releaser provided with a float is connected to the outlet of the vacuum milk receiver, and, when the milk releaser is filled up with milk, the float acts through a linkage to close a vacuum line connecting the first milk releaser to the vacuum milk receiver and establish a communication with the external atmosphere. The first milk releaser is in communication through an air line to an air-operated two-way valve, and the two-way valve is operated such that it is able to change a second milk releaser which is connected to the outlet of the first milk releaser and is under atmospheric pressure, to a vacuum, so that the milk that has collected in the first milk releaser can be aspirated out by the second milk releaser. The milk is let out of the second milk releaser into a bulk milk tank that is under atmospheric pressure.

5 Claims, 1 Drawing Figure

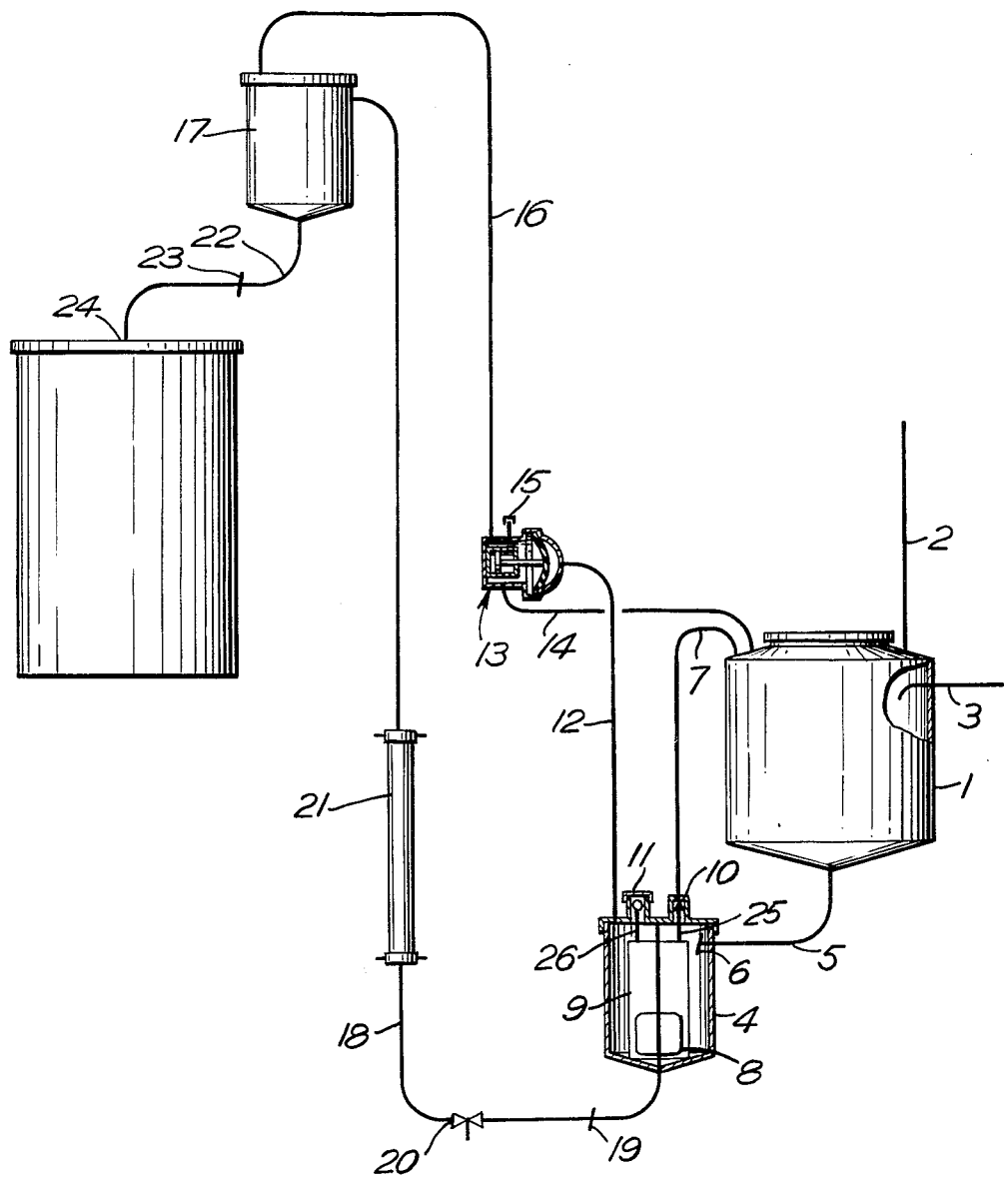

MILK PUMPING SYSTEM FOR VACUUM MILKING INSTALLATIONS

BACKGROUND OF THE INVENTION

The invention relates to a milk pumping apparatus for vacuum milking installations for the withdrawal of milk from a milk receiver that is constantly under a vacuum to atmospheric pressure, while the milk receiver is connected with a milk releaser by a milk outlet line having a clack valve, and the milk releaser has a float which, when the milk releaser is full of milk, operates valves which shut off a vacuum line connecting the milk releaser to the milk receiver and open a line leading to the external atmosphere.

A milk pumping apparatus of this kind is generally known in which the milk is withdrawn from the milk releaser to bulk milk tanks or pipes which are under atmospheric pressure.

To prevent vacuum losses in milking, the milk produced at the milk stalls is carried in modern milking installations through milk collecting pipes to a receiver which is normally situated below the floor of the milking stall, the milk having to be pumped to bulk tanks situated at a higher elevation and farther away.

German Offenlegungsschrift No. 2,426,458 discloses a milk pumping apparatus in which a float is provided in the milk releaser connected to the outlet from the milk receiver, and when the milk releaser is filled with milk, the float opens a valve from the vacuum line to the receiver, and at the same time opens a second valve connected to a compressed air line. In this system, the milk releaser, which at first is under vacuum, is filled with air under pressure, whereupon the clack valve disposed in the drain line from the milk receiver is closed and the clack valve in the outlet from the milk releaser is opened. The milk is pumped to tanks situated at higher levels according to the amount of pressure in the milk releaser.

A disadvantage of this process is, however, the necessary supply of compressed air, which has to be produced by an air compressor.

Likewise, it is common to pump the milk to higher and more remote bulk tanks by means of an electric pump, and a filter is also frequently provided between the pump and the bulk tank to filter the milk.

SUMMARY OF THE INVENTION

To enable the milking stalls to continue in operation even in case of a power failure, it is generally desirable to avoid electrically powered units in milking installations.

Therefore, it is the object of the present invention to create a milk pumping apparatus which withdraws the milk from the vacuum receiver into tanks situated at higher elevations and at atmospheric pressure, by using only the vacuum that is present in milking installations.

This object is achieved in accordance with the invention by the fact that the milk releaser is in communication through an air line with an air-operated two-way valve, and the two-way valve can be operated such that it can apply a vacuum to a second milk releaser which is connected to the outlet of the first milk releaser and is under atmospheric pressure, so that the milk gathered in the first milk releaser can be aspirated by the second milk releaser.

With this system of two milk releasers it is possible to withdraw the milk from the milk receiver and pump it to bulk milk tanks which are under atmospheric pressure and situated at a higher level, without loss of pressure in the vacuum system. The height to which the milk can be pumped will depend on the vacuum present in the system and on the resistance of a filter disposed in the pipeline.

BRIEF DESCRIPTION OF THE DRAWINGS

Other characteristics and features of the milk pumping system of the invention will be described in the claims and in the following description of an embodiment thereof with reference to the attached FIGURE which is a schematic of the system according to the invention.

DETAILED DESCRIPTION OF THE INVENTION

In the FIGURE, 1 identifies the vacuum milk receiver which is connected to a line 2 which is under constant vacuum, and to a milk collecting line 3 which runs to the milking stalls, which are not represented. To the outlet of the vacuum receiver there is connected a first milk releaser 4 which is connected to the vacuum receiver by an outlet line 5 provided with a clack valve 6 and by a vacuum line 7. The first milk releaser 4 is provided with a float 8 which, when the releaser is filled with milk closes, by means of a linkage 9, a valve 10 disposed in the vacuum line 7 and opens a ball valve 11 connected to the external atmosphere. From the milk releaser 4, a conduit 12 runs to a diaphragm-controlled two-way valve 13, which in turn is connected by a vacuum line 14 to the vacuum receiver 1, which is constantly under vacuum. The two-way valve 13 also has a pipe 15 opening to the atmosphere and a line 16 leading to a second milk releaser 17 which is connected to the outlet from the first milk releaser 4. The connection between the first and second milk releaser consists of a line 18 in which there is disposed a clack valve 19, a draincock 20, and a filter 21. From the second milk releaser 17 runs a drain line 22 having a clack valve 23 and leading into a bulk milk tank 24 that is under atmospheric pressure.

The milk pumping system operates as follows: At the beginning of the milking, a vacuum prevails in the vacuum milk receiver 1 and the first milk releaser 4 is under a vacuum through the lines 5 and 7, and likewise the connecting line 18 from the first milk releaser 4 to the closed clack valve 19 and line 12 to the diaphragm-controlled two-way valve 13. The two-way valve is connected such that through the connection 15, atmospheric air passes through connecting line 16 into the second milk releaser. The connecting line 18 from the second milk releaser to the valve 19 is likewise under atmospheric pressure, as is also the outlet line 22.

After the milk has begun to flow through the milk collecting line 3 into the vacuum milk receiver 1, milk also flows into the first milk releaser 4, causing the float 8 to rise slowly in the tank. As soon as the float has reached the upper part of the linkage 9, the linkage also rises with the float, and a valve plunger 25 connected to the linkage closes the valve 10 to the vacuum line 7 and another plunger 26 connected to the linkage opens a ball valve 11 to the atmosphere. When atmospheric air flows into the first milk releaser 4, atmospheric air flows simultaneously through the line 12 to the two-way valve 13, causing a changeover from atmospheric pressure to a vacuum through lines 14 and 16 into the second milk receiver 17. At the same time, the connecting line 18 is under a vacuum so that the clack valve 19 will open, and the milk can flow from the first milk releaser 4 through line 18 into the second milk releaser 17, the clack valve 23 being closed by the vacuum in the second milk receiver 17.

The milk pumping is supported by the atmospheric pressure prevailing in the first milk releaser when clack valve 6 is closed. The milk then flows through the filter 21 installed in the connecting line 18. As soon as the float in the first milk releaser 4 has reached the bottom of the linkage 9 as the milk level recedes, the valve 10 is reopened and ball valve 11 is closed, so that the first milk releaser 4 is again under vacuum and the second milk releaser 17 is under atmospheric pressure, so that the milk can flow from the second releaser 17, when clack valve 23 is open, into the bulk milk tank 24 which is under atmospheric pressure. After that the filling and emptying can be repeated.

The draincock 20 in the connecting line 18 is required for the purpose of emptying the lines at the end of the milking.

It will be appreciated that the instant specification and claims are set forth by way of illustration and not limitation, and that various modifications and changes may be made without departing from the spirit and scope of the present invention.

What is claimed is:

1. In a milk pumping apparatus for a vacuum milking installation for withdrawing milk from a milk receiver under constant vacuum to atmospheric pressure, having a first milk releaser including a liquid input connected to the milk receiver by a milk outlet line with a clack valve, a milk outlet, a first valve for opening and closing a vacuum line between the milk receiver and the first milk releaser, a second valve for opening and closing a vent to the atmosphere and a float for opening the first valve and closing the second valve when there is less than a preselected amount of milk in the first milk releaser and for closing the first valve and opening the second valve when there is more than a preselected amount of milk in the first milk releaser the improvement comprising:

an air actuated two-way valve having one inlet connected to the atmosphere, another inlet connected to a vacuum, an outlet, and an actuating input connected by an air line to the first milk releaser and directly responsive to the prevailing pressure in the first milk releaser such that the valve's outlet is in communication with the one inlet when the first milk releaser and thereby the actuating input is under a vacuum and in communication with the other inlet when the first milk releaser and thereby the actuating input is at atmospheric pressure; a second milk releaser having a fluid inlet connected to the outlet of the two-way valve and a milk inlet; and means connecting the milk inlet of the second milk releaser to the milk outlet of the first milk releaser whereby milk collected in the first releaser is aspirated by the second milk releaser while a vacuum is maintained in the second milk releaser.

2. The apparatus according to claim 1, wherein the other inlet of the two-way valve includes a vacuum line connected to the vacuum in the milk receiver.

3. The apparatus according to claim 1 or 2 wherein the connecting means comprises a connecting line having a clack valve.

4. The apparatus according to claim 3, wherein the connecting means further comprises a filter in the connecting line.

5. The apparatus according to claim 4, wherein the second milk releaser has a milk outlet and an outlet line with a clack valve for connecting to a storage tank.

* * * * *